United States Patent [19]

Willcock et al.

[11] 4,189,668
[45] Feb. 19, 1980

[54] D.C. MOTOR SNUBBING

[75] Inventors: Derrick H. Willcock, Germiston; Stanley Marcus, Sandton; Ronald E. Hamm, Edenvale; David N. Bowden, Alberton, all of South Africa

[73] Assignee: Westinghouse-Bellambie (Proprietary) Limited, Alrode, South Africa

[21] Appl. No.: 870,808

[22] Filed: Jan. 19, 1978

[30] Foreign Application Priority Data

Jan. 20, 1977 [ZA] South Africa ................ 77/0337

[51] Int. Cl.² ........................................ H02P 3/12
[52] U.S. Cl. ........................................ 318/379; 318/375; 318/380; 318/468
[58] Field of Search .............. 318/57, 261, 264, 265, 318/266, 267, 275, 281, 282, 296, 297, 375, 379, 380, 381, 466, 468, 762

[56] References Cited

U.S. PATENT DOCUMENTS

| | | | |
|---|---|---|---|
| 3,295,037 | 12/1966 | Bullene | 318/261 |
| 3,341,758 | 9/1967 | Plumpe, Jr. | 318/375 |
| 3,582,747 | 6/1971 | Kearns | 318/379 |
| 3,628,112 | 12/1971 | Gross | 318/380 |
| 3,727,118 | 4/1973 | Makino | 318/297 |
| 3,987,349 | 10/1976 | Shibata et al. | 318/376 |

Primary Examiner—Gene Z. Rubinson
Assistant Examiner—M. K. Mutter
Attorney, Agent, or Firm—Young & Thompson

[57] ABSTRACT

The invention provides snubbing apparatus for a D.C. motor in which a capacitor which is charged while the motor is rotating in a first direction is discharged into the gate of a thyristor to initiate the snubbing action. When the thyristor goes on a field coil is connected in series with the motor armature, so as to place the motor in a regenerative mode and snub the motor.

7 Claims, 1 Drawing Figure

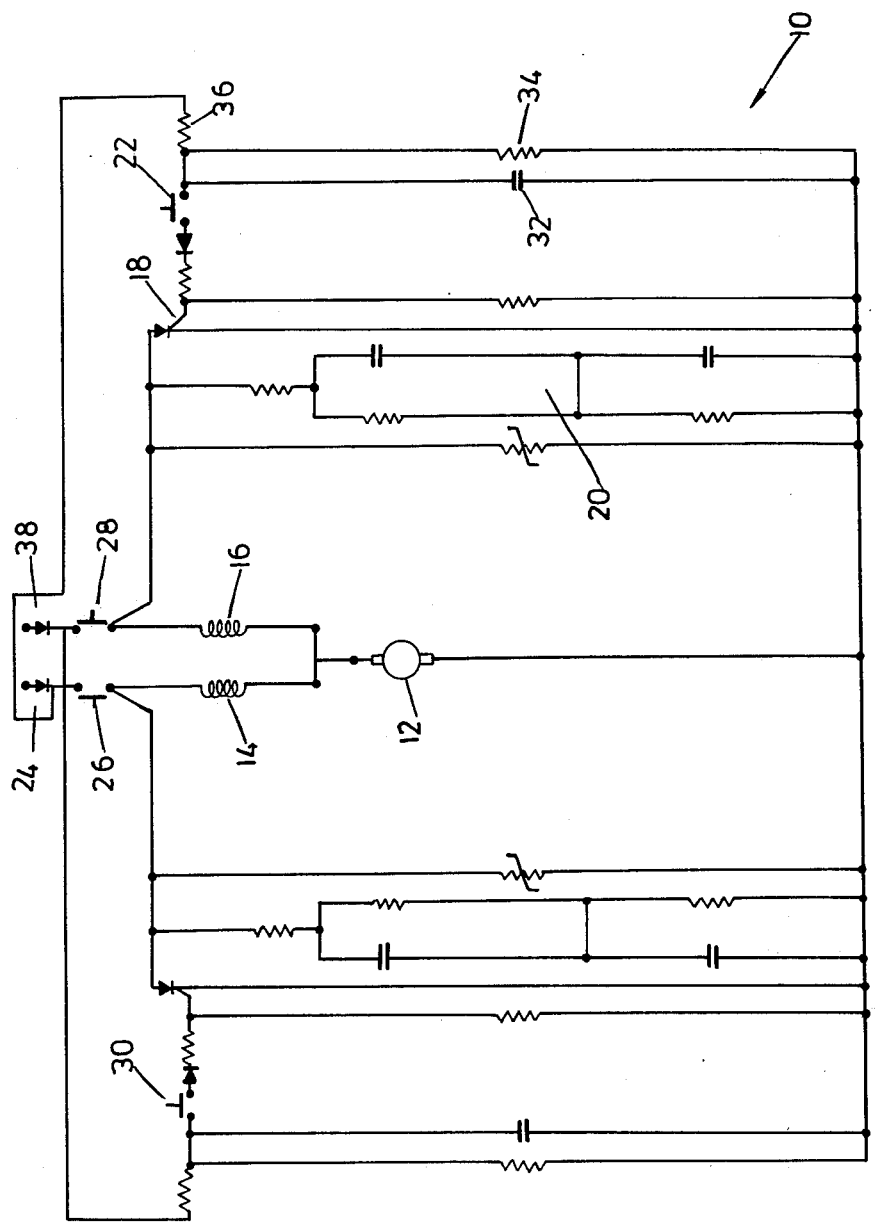

D.C. MOTOR SNUBBING

BACKGROUND TO THE INVENTION

This invention relates to the snubbing, i.e. braking, of a D.C. motor and particularly to the snubbing of a motor in a points machine.

A points machine is a device used on a railway for the operation of points, crossings and similar equipment. Typically a points machine controls the movement of displaceable sections of track. The track sections are connected to rods or levers which are actuated by means of a motor, the rotary motion of the motor being translated into linear motion by means of a ball-screw or similar device. In the interests of safety it is essential that the movement effected by the points machine be positive; in other words the track section must always be placed in the correct position. However where use is made of an electric motor in the points machine, this requirement can cause problems, for although the electrical supply to the motor may be interrupted once the track sections are correctly positioned the momentum of the rotating rotor of the motor tends to continue the movement of the ball screw, and when this is in a limiting position the resulting strain on the parts of the points machine can cause serious damage.

Where a motor is a D.C. motor snubbing is generally effected by switching the motor into a regenerative mode. To the best of the applicant's knowledge this is done by means of mechanical switches and mechanical devices which detect the sense of rotation of the D.C. motor. However the operation of these switches, and other devices which rely on an external power supply, is not consistent, particularly where the points machine is installed in a hostile environment.

SUMMARY OF THE INVENTION

It is an object of the present invention to provide an improved method of snubbing a D.C. motor.

According to the invention a method of snubbing a D.C. motor includes the steps of storing a quantity of electrical energy, interrupting the electrical supply to the motor, and utilizing the stored energy to actuate switching means arranged to place the motor in a regenerative mode to dissipate its rotational energy.

Further according to the invention the stored energy is derived from the electrical supply to the motor.

The invention also provides apparatus for snubbing a D.C. motor which has a first series field coil to allow the rotor of the motor to be rotated in a first direction, and a second series field coil to allow the rotor to be rotated in a second direction opposite to the first direction, the apparatus comprising first energy storage means, first switching means to interrupt the supply of electric current through the first field coil to the motor, and second switching means operable by the first energy storage means to connect the second field coil in series with the motor armature thereby to place the motor in a regenerative mode to dissipate its rotational energy.

Further according to the invention the energy storage means is a capacitor which is charged by the supply to the motor.

DESCRIPTION OF THE INVENTION

The invention is further described by way of example with reference to the accompanying drawing which is a circuit diagram of apparatus according to the invention for snubbing a D.C. motor.

Referring to the drawing there is provided apparatus 10 for snubbing a D.C. motor 12 which has a first series field coil 14 to allow the motor to be driven in a first direction and a second series field coil 16 to allow the motor to be driven in a second direction opposite to the first direction. The apparatus on one side of the motor in the drawing is identical to the apparatus on the other side and the description of the invention is therefore limited to one half of the apparatus only. The second coil 16 is shunted by a thyristor 18 and a protective circuit 20. A contact 22 is connected to a supply terminal 24 which passes through a contact 26 to the first series field coil 14. The contacts 22 and 26 are linked in such a way that when the contact 22 is closed, the contact 26 is open, and vice versa. Similar contacts 28 and 30 are provided for the other half of the circuit. A capacitor 32 and a resistance 34 shunt the gate of the thyristor 18.

Assume that the contacts 26 and 30 are closed and the contacts 22 and 28 are open and that power is applied to the motor from the terminal 24 through the first series field coil 14. The motor then runs in a first direction and during this period the capacitor 32 is charged through a resistor 36. The degree of movement effected by the motor on the points machine is sensed by suitable contacts (not shown) which cause the contact 28 to close and the contact 30 to open when the points machine is approximately at mid-stroke. At the end of the stroke the contact 26 is caused to open and the contact 22 is closed. The supply is thus removed from the motor. However the motor continues rotating in the same direction under its own momentum. The capacitor 32 at this instant discharges into the gate of the thyristor 18 turning it on. This process places the second coil 16 in series with the armature of the motor. Residual magnetism in the armature causes the emf to build up rapidly and the motor is placed in a regenerative mode. The kinetic energy of the rotor is then dissipated in the form of electrical energy in the second coil 16. The motor thus comes to a halt with the contacts 22 and 28 closed and the contacts 26 and 30 open in readiness for the return stroke of the points machine.

To drive the motor in the opposite direction D.C. power is applied to the terminal 38 and the motor then rotates in the reverse direction. Snubbing of the motor is effected in exactly the same way by the circuit to the left of the motor in the drawing.

This circuit has the particular advantage that no external power supply is required to initiate the regenerative braking of the motor for this is effected by means of the charge stored in the capacitors.

We claim:

1. A method of snubbing a D.C. motor which is connected in series with a first field coil to an electrical supply, the method including the steps of storing a quantity of electrical energy, interrupting the electrical supply to the motor, and electrodynamically braking the motor by utilizing only the stored energy to actuate switching means which connects a second field coil in series with the motor armature.

2. A method according to claim 1 wherein the stored electrical energy is derived from the electrical supply.

3. Apparatus for snubbing a D.C. motor which has a first series field coil to allow the rotor of the motor to be rotated in a first direction, and a second series field coil to allow the rotor to be rotated in a second direction which is opposite to the first direction, the apparatus comprising first switching means which is in series with the motor armature, the first series field coil and an electrical supply, first energy storage means which is charged by the electrical supply, second switching means which is in series with the second series field coil and the motor armature, and third switching means which connects the first energy storage means to the second switching means when the first switching means is actuated to disconnect the motor armature from the electrical supply, the second switching means being responsive only to energy from the first energy storage means whereby the second switching means is actuated and connects the second series field coil in series with the motor armature to cause electrodynamic braking of the motor.

4. Apparatus according to claim 3 in which the first energy storage means is a capacitor.

5. Apparatus according to claim 3 in which the second switching means is a thyristor.

6. Apparatus according to claim 3 in which the first switching means and the third switching means are provided by first and second contact pairs respectively on a relay, the first contact pair being closed when the second contact pair is open, and vice versa.

7. Apparatus according to claim 3 which further comprises fourth switching means which is in series with the motor armature, the second series field coil and the electrical supply, second energy storage means which is charged by the electrical supply, fifth switching means which is in series with the first series field coil and the motor armature, and sixth switching means which connects the second energy storage means to the fifth switching means when the fourth switching means is actuated to disconnect the motor armature from the electrical supply, the fifth switching means being responsive only to energy from the second energy storage means whereby the fifth switching means is actuated and connects the first series field coil in series with the motor armature to cause electrodynamic braking of the motor.

* * * * *